United States Patent
Nakamura et al.

(10) Patent No.: US 9,290,109 B2
(45) Date of Patent: Mar. 22, 2016

(54) INVERTED PENDULUM MOVING APPARATUS AND CONTROL METHOD THEREFOR

(75) Inventors: Ryosuke Nakamura, Tokyo (JP); Azusa Amino, Tokyo (JP); Taishi Ueda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 2 days.

(21) Appl. No.: 14/363,747

(22) PCT Filed: Dec. 9, 2011

(86) PCT No.: PCT/JP2011/078576
§ 371 (c)(1),
(2), (4) Date: Jun. 6, 2014

(87) PCT Pub. No.: WO2013/084354
PCT Pub. Date: Jun. 13, 2013

(65) Prior Publication Data
US 2015/0274032 A1    Oct. 1, 2015

(51) Int. Cl.
*G05D 1/08*    (2006.01)
*B60L 15/20*    (2006.01)
*B62K 3/00*    (2006.01)

(52) U.S. Cl.
CPC .............. *B60L 15/20* (2013.01); *B62K 3/007* (2013.01); *G05D 1/0891* (2013.01)

(58) Field of Classification Search
CPC ...... B60L 15/20; B62K 3/007; G05D 1/0891; B60W 2550/14; B60W 2550/142; B60W 2550/143; B60W 2550/148
See application file for complete search history.

(56) References Cited

U.S. PATENT DOCUMENTS

| 2010/0017090 A1* | 1/2010 | Doi ................................... 701/91 |
| 2010/0023220 A1* | 1/2010 | Nakashima et al. ............ 701/42 |
| 2011/0098884 A1 | 4/2011 | Doi |

FOREIGN PATENT DOCUMENTS

| JP | 2007-319991 A | 12/2007 |
| JP | 2008-263676 A | 10/2008 |
| JP | 2009-040365 A | 2/2009 |
| JP | 2011-105072 A | 6/2011 |

OTHER PUBLICATIONS

International Search Report dated Jan. 24, 2012 (Two (2) pages).

* cited by examiner

*Primary Examiner* — Michael J Zanelli
(74) *Attorney, Agent, or Firm* — Crowell & Moring LLP (57) ABSTRACT

The invention is directed to an inverted pendulum moving apparatus that may address various kinds of disturbance forces and a control method therefor. The apparatus has one or more wheels coaxially arranged and a center of gravity of parts other than the wheel located above an axle, includes an inversion control part that discriminates a cause of a disturbance force based on a wheel rotation speed of the wheel and the disturbance force and determines output torque to the wheel based on the determination result.

17 Claims, 6 Drawing Sheets

| WHEEL ANGULAR VELOCITY | ESTIMATED DISTURBANCE FORCE | DISCRIMINATION RESULT |
|---|---|---|
| + | + | SLIP |
| − | − | |

FIG. 6

| WHEEL ANGULAR VELOCITY | ESTIMATED DISTURBANCE FORCE | DISCRIMINATION RESULT |
|---|---|---|
| + | − | FORWARD AND UPWARD LEVEL DIFFERENCE |
| − | 0 | |
| + | + | FORWARD AND DOWNWARD LEVEL DIFFERENCE |
| − | 0 | |
| − | + | BACKWARD AND UPWARD LEVEL DIFFERENCE |
| + | 0 | |
| − | − | BACKWARD AND DOWNWARD LEVEL DIFFERENCE |
| + | 0 | |

FIG. 7

| WHEEL ANGULAR VELOCITY | ESTIMATED DISTURBANCE FORCE | DISCRIMINATION RESULT |
|---|---|---|
| + | − | UPWARD SLOPE |
| − | − | |
| + | + | DOWNWARD SLOPE |
| − | + | |

FIG. 8

| WHEEL ANGULAR VELOCITY | ESTIMATED DISTURBANCE FORCE | DISCRIMINATION RESULT |
|---|---|---|
| + | − | SOFT ROAD SURFACE |
| − | + | |

INVERTED PENDULUM MOVING APPARATUS AND CONTROL METHOD THEREFOR

TECHNICAL FIELD

This invention relates to an inverted pendulum moving apparatus that travels on various road surfaces and a control method therefor.

BACKGROUND ART

An inverted pendulum moving apparatus being in contact with the ground via wheels and having one or more wheels coaxially arranged and the center of gravity of other parts than the wheels (the center of gravity of parts mounted on the wheels) located above the axle is statically unstable, and significantly affected by the road surface for keeping stability by dynamic control with movement. In this case, as a background art for preventing behavior instability of the inverted pendulum moving apparatus due to the influence of the road surface, for example, technologies described in PTL 1 and PTL 2 have been disclosed.

PTL 1 has disclosed a self-propelled vehicle that determines, in a pair of right and left wheels and motors driving the respective wheels, output torque of the respective motors in response to disturbance torque loaded with respect to each motor, a control device and a control method therefor. The self-propelled vehicle according to the technology may continue to properly travel even when the disturbance torque is loaded.

Further, PTL 2 has disclosed a vehicle that estimates a road surface gradient in consideration of a posture change of a vehicle body and corrects drive torque in response to the road surface gradient. The vehicle according to the technology may realize stable stop state and traveling state regardless of the gradient of the road surface.

CITATION LIST

Patent Literature

PTL 1: JP-A-2008-263676
PTL 2: JP-A-2009-40365

SUMMARY OF INVENTION

Technical Problem

Regarding inverted pendulum moving apparatuses, there are cases where the apparatuses are used as mobile units on which humans mount, where the apparatuses move in indoor living spaces of humans as service robots, etc. because of smaller bottom areas. As described above, activities in various environments while coexisting with humans are expected for the inverted pendulum moving apparatuses. When the inverted pendulum moving apparatuses are utilized under the situations, fall prevention, ride comfort, and stability are important and suppression of shake and swing widths of upper bodies are necessary.

The inverted pendulum moving apparatus accelerates in anteroposterior directions at small intervals for balance. However, the behavior of the wheels necessary for stabilizing operation is significantly affected by the road surface, and particularly, it may be hard to suppress shake at the low velocity such that the direction of the vehicle rotation speed is frequency changed. For example, on the soft road surface of a grassland, carpet, or the like, a disturbance force to hinder the movement of the wheels is generated in the wheels and the disturbance force changes its direction in response to the direction of the wheel rotation speed. That is, the wheels sink on the soft road surface, and a resisting force is constantly applied to the wheels in movement in any direction. Accordingly, there is a problem that the operation of accelerating in anteroposterior directions at small intervals in the inverted pendulum moving apparatus is inhibited and the operation becomes unstable.

However, in related art of correcting the disturbance force, a technology of sufficiently compensating for various kinds of disturbance forces on the soft road surface, a slope, or the like is not disclosed. That is, in related art of PTL 1 and PTL 2, one kind of disturbance force may be addressed, however, application of other disturbance forces than the target force can not be addressed.

For example, the case using the technology described in PTL 1 of addressing the road surface inclination and the level difference by estimating the disturbance force applied from the road surface using a disturbance force observer and the technology described in PTL 2 in which the technology of estimating the road surface inclination will be explained. The disturbance force by the assumed road surface inclination and level difference is in one direction regardless of the wheel velocity of the mobile unit. On the other hand, when the inverted pendulum moving apparatus stops or moves at a low velocity on the soft road surface, the direction of the wheel velocity largely changes and the direction of the disturbance force rapidly changes. Accordingly, to address the soft road surface using the disturbance force observer that assumes the disturbance force in one direction, correction may be performed in a direction in which the disturbance force is strengthened when the wheel velocity is changed. As a result, the shake of the inverted pendulum moving apparatus may be amplified.

That is, it is difficult to realize the technology described in PTL 2 using the technology described in PTL 1. It is also difficult to realize the technology described in PTL 1 using the technology described in PTL 2. In short, it is difficult to address various kinds of disturbance forces by a simple combination of the related technologies.

The invention has been achieved in view of the background, and an object of the invention is to provide an inverted pendulum moving apparatus that may address various disturbance forces and a control method therefor.

Solution to Problem

In order to solve the above described problem, the invention is an inverted pendulum moving apparatus having one or more wheels coaxially arranged and a center of gravity of parts mounted on the wheel located above an axle, including an inversion control part that discriminates a cause of a disturbance force based on a rotation state of the wheel and determines output torque to the wheel based on the discrimination result.

Advantageous Effects of Invention

According to the invention, an inverted pendulum moving apparatus that may address various disturbance forces and a control method therefor may be provided.

DESCRIPTION OF EMBODIMENTS

Next, modes for implementing the invention (referred to as "embodiments") will be explained in detail with reference to the drawings accordingly. Note that, in the respective drawings, the same component elements have the same signs and their explanation will be omitted.

[Apparatus Configuration]

Figure 1:
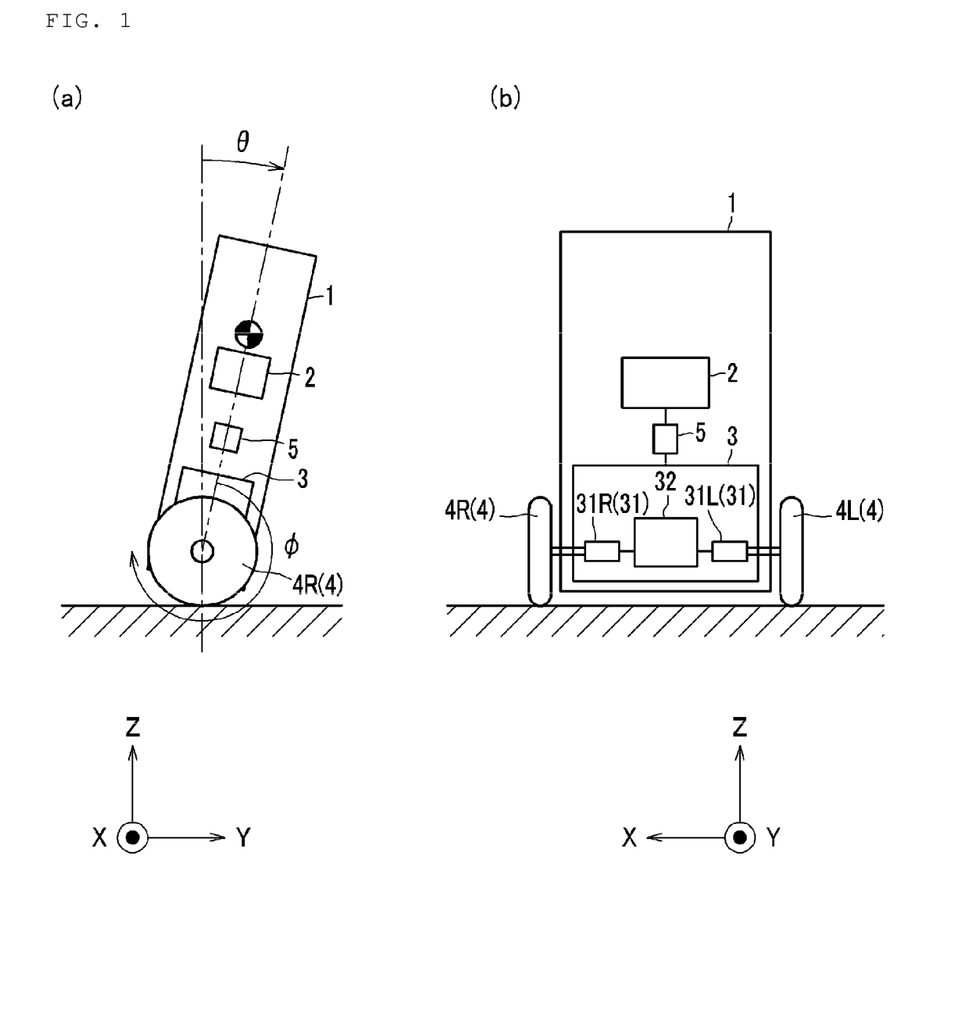
FIG. 1 shows configuration outer schematic diagrams of an inverted pendulum moving apparatus according to the embodiment.

FIG. 1 shows configuration outer schematic diagrams of an inverted pendulum moving apparatus according to the embodiment.

FIG. 1(a) is a side view of the inverted pendulum moving apparatus according to the embodiment, and FIG. 1 (b) is a front view of the inverted pendulum moving apparatus.

As shown in FIGS. 1(a) and 1(b), an inverted pendulum moving apparatus 1 includes a pair of coaxial right and left wheels 4R, 4L (4), a moving mechanism unit 3, and other parts as an upper body section. In the inverted pendulum moving apparatus 1, the wheels 4R, 4L are coaxially arranged and the center of gravity of the other parts than the wheels 4 (the center of gravity of the parts mounted on the wheels) are located above the axle. In the embodiment, the number of the wheels 4 is two, however, may be one or more.

The moving mechanism unit 3 includes a mechanism control part 32 and motors 31R, 31L (31) that respectively rotate the wheels 4R, 4L. The wheels 4R, 4L are connected to the independent motors 31R, 31L, respectively. The motors 31R, 31L are connected to the mechanism control part 32 and respectively controlled to generate predetermined torque. The mechanism control part 32 acquires wheel angles $\phi_R$, $\phi_L$ and wheel angular velocities $d\phi_R$, $d\phi_L$ of the wheels 4R, 4L via the motors 31R, 31L. Hereinafter, simply, a wheel angle θ may be treated as a right and left average of the wheel angles $\phi_R$, $\phi_L$ and a wheel angular velocity $d\phi$ may be treated as an average of the wheel angular velocities $d\phi_R$, $d\phi_L$ accordingly. Here, the wheel angular velocity is an angular velocity around the wheel axle.

The upper body section is provided in the upper part of the moving mechanism unit 3. The upper body section includes a calculation unit 2 for performing respective calculations to be described later, and a posture sensor 5 (e.g., gyro sensor) for measurement of an inclination angle θ formed by a line connecting the position of center of gravity of the inverted pendulum moving apparatus 1 except the wheels 4R, 4L and the axle and the vertical direction, and an inclination angular velocity dθ. Note that the calculation unit 2 and the moving mechanism unit 3 are connected to the posture sensor 5 for exchange of information.

Figure 2:
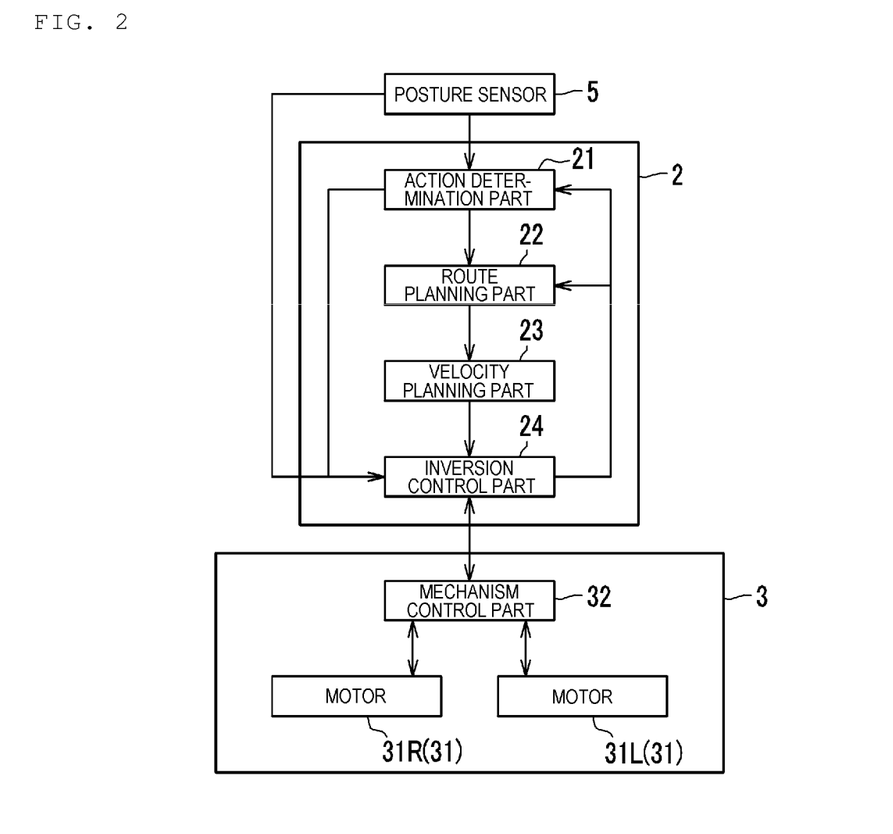
FIG. 2 is a functional block diagram of the inverted pendulum moving apparatus according to the embodiment.

FIG. 2 is a functional block diagram of the inverted pendulum moving apparatus according to the embodiment.

As shown in FIG. 2, the calculation unit 2 includes an action determination part 21, a route planning part 22, a velocity planning part 23, and an inversion control part 24. Further, the calculation unit 2 is connected to the posture sensor 5 and the moving mechanism unit 3. Note that processing of the inversion control part 24 is characteristic to the embodiment.

Here, the calculation unit 2 and the respective parts 21 to 24 are embodied by execution of programs stored in a ROM (Read Only Memory) (not shown) by a CPU (Central Processing Unit).

As below, a method of generating a route plan will be briefly explained. Note that the route planning is necessary when the inverted pendulum moving apparatus 1 is autonomous, but dispensable when the apparatus is a boarding type that a human boards and operates.

The action determination part 21 determines an immediate movement target of the inverted pendulum moving apparatus 1. Information of the immediate movement target (movement target information) contains respective information of a movement destination position pr, a movement destination direction, the maximum movement velocity Vmax, and the maximum wheel torque Vmax. The information is programmed in advance and the next movement target is set by the program at each time when the movement destination position is reached. The action determination part 21 acquires a current position p from the inversion control part 24. Further, when the action determination part 21 acquires a level difference signal containing information representing that a cause of the estimated disturbance force applied to the wheels 4R, 4L is a level difference and information on a direction in which the level difference exists (forward and upward level difference, etc.) (information of level difference type) from the inversion control part 24, if the distance between a current position p and the movement destination position pr is shorter than a preset distance, the movement destination position pr of the movement target is shifted in an opposite direction to the level difference shown by the level difference signal by the preset distance for avoidance of instability.

The route planning part 22 acquires the movement target from the action determination part 21 and the current position p and a current turn direction ω from the inversion control part 24, and generates an immediate route. For the method of generating the immediate route, generally, a method of connecting the current position p and the movement destination position pr with a straight line is used. Alternately, as the method of generating the immediate route, if a turn direction ωr as a target in the movement destination position pr and the current position p and the current turn direction ω are different, a method using a Bezier curve or a spline curve smoothly connecting the current position p and the movement destination position pr as the immediate route may be used. Further, the route planning part 22 transmits the generated immediate route information to the velocity planning part 23 as a group of position coordinate data (x,y,ω) of points on the route.

The velocity planning part 23 acquires the immediate movement target from the action determination part 21, acquires the route plan from the route planning part 22, acquires the inclination angle θ and the inclination angular velocity dθ of the upper body from the posture sensor 5, acquires the wheel angular velocity dφ from the moving mechanism unit 3 via the inversion control part 24, and generates a velocity plan of the whole route based on the acquired respective information. Further, the velocity planning part 23 transmits the generated velocity plan of the whole route and the acquired whole route plan to the inversion control part 24.

The velocity plan includes a velocity plan on translation and a velocity plan on turn, and the velocity plan on translation may be generated by a method described in JP-A-2007-319991, for example. In this method, the inverted pendulum moving apparatus 1 obtains a feature point q as a linear sum of the wheel angle φ and the inclination angle θ using an equation of motion of itself. Then, the inverted pendulum moving apparatus 1 determines the movement target by representing the target with a derivative obtained by multiple differentiation as a parameter. Further, the inverted pendulum moving apparatus 1 generates a velocity plan including the velocity angle φ, the wheel angular velocity dφ, the inclination angle θ, and the inclination angular velocity dθ. In this regard, as the movement distance of the target whole velocity plan, distances of the respective immediate movement target positions along the whole route plan are used. Then, the inverted pendulum moving apparatus 1 calculates the velocity plan on turn from the generated velocity plan on translation and the route plan. The velocity plan on turn includes the turn direction ω and a turn direction velocity dω to be taken on the route. Supposing that the position coordinate data of a point on the route forming the route plan is pr[i] (i is a data number) and a location to be taken by the inverted pendulum moving apparatus 1 at time t is pr[k], k is determined by searching for a value that minimizes the following formula (1).

$$\left\| \sum_{i=1}^{k} (pr[i] - pr[i-1]) - \int_{t0}^{t} vr(j)dj \right\| \quad (1)$$

Note that $\|\cdot\|$ expresses norm and vr(j) is a movement velocity at time j and multiplication of a wheel angular velocity $d\phi_r(j)$ by a radius s of the wheel 4 in the velocity plan at the same time. Further, t0 is a time when the plan starts. Furthermore, a turn direction velocity $d\omega_r[k]$ at time t (=corresponding to the position coordinate data pr[k]) is determined by the formula (2).

$$d\omega_r[k] = \frac{vr(t)}{R[k]} \quad (2)$$

Here, R[k] is a turn radius. R[k] is calculated with center coordinates of turn circles a, b by substitution of x, y coordinates of three points of pr[k−1], pr[k], pr[k+1] in the following formula (3) and setting up of simultaneous equations.

$$(x-a)^2 + (y-b)^2 = R[k]^2 \quad (3)$$

In the above described manner, the velocity plan on turn including target values of the turn direction and the turn direction velocity at time t is calculated.

The inversion control part 24 calculates instruction torque $\tau_r$ to the motor 31 from the velocity plan and the route plan, a current state, and the estimated disturbance force, and transmits the torque to the mechanism control part 32. The processing of the inversion control part 24 will be explained in detail using FIG. 3 and subsequent drawings.

[Inversion Control Processing]

Figure 3:
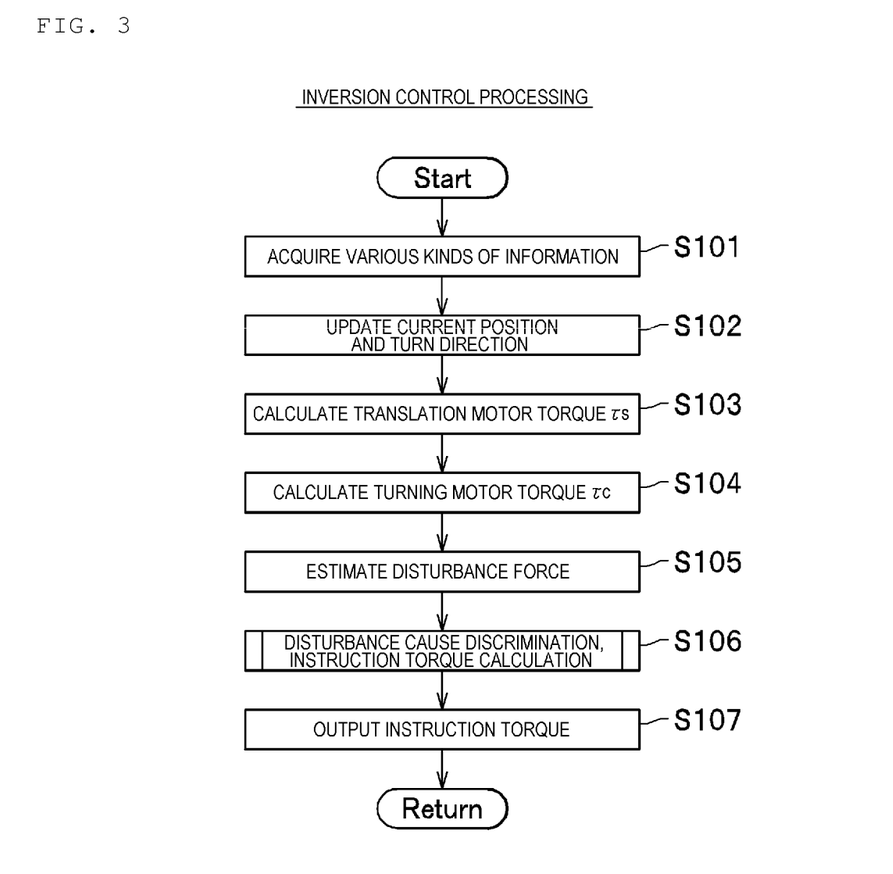
FIG. 3 is a flowchart showing a procedure of inversion control processing by an inversion control part according to the embodiment.

FIG. 3 is a flowchart showing a procedure of the inversion control processing by the inversion control part according to the embodiment.

First, the inversion control part 24 acquires the velocity plan, the route plan, etc. from the velocity planning part 23, and further acquires various kinds of information including the rotation angles $\phi_R$, $\phi_L$ of the wheels 4R, 4L, the rotation angular velocities $d\phi_R$, $d\phi_L$ of the wheels 4R, 4L, and motor torque $\tau_R$, $\tau_L$ of the wheels 4R, 4L output immediately before from the moving mechanism unit 3 (S101).

Then, the inversion control part 24 updates the current position and the turn direction of the inverted pendulum moving apparatus 1 (S102). The update is performed based on the following formulae (4).

$$p(t0) = \left( \int_0^{t0} v(t)\cos\omega(t)dt, \int_0^{t0} v(t)\sin\omega(t)dt \right) \quad (4)$$

$$v(t) = s(d\phi_R(t) + d\phi_L(t))/2$$

$$\omega(t) = \int_0^{t0} d\omega(t)dt$$

$$d\omega(t) = s(d\phi_L(t) - d\phi_R(t))/f$$

Here, t is time and t0 is the current time. Further, the wheel angles $\phi_R$, $\phi_L$ and the rotation angular velocities $d\phi_R$, $d\phi_L$ are described by a function of time t using past data. Furthermore, v is the movement velocity of the inverted pendulum moving apparatus 1, s is the radius of the wheels 4, and f is a distance between the wheels 4R, 4L.

Then, the inversion control part 24 calculates translation motor torque $\tau_s$ using the following formula (5) (S103).

$$\tau_s = [K_1 \ K_2 \ K_3 \ K_4] \begin{bmatrix} \theta - \theta_r \\ \phi - \phi_r \\ d\theta - d\theta_r \\ d\phi - d\phi_r \end{bmatrix} \quad (5)$$

Here, $K_j$ (j=1, 2, 3, 4) is a scalar quantity and a value heuristically set or set according to LQR (Linear Quadratic Regulator) or the H-infinity control theory. Further, $\theta_r$, $d\theta_r$, $\phi_r$, $d\phi_r$ are an inclination angle target value, an inclination angular velocity target value, a wheel angle target value, and a wheel angular velocity target value at the time t obtained from the route plan, respectively.

Subsequently, the inversion control part 24 calculates a turn motor torque $\tau_c$ for following the route using the following formula (6) (S104).

$$\tau_c = [K_5 \ K_6 \ K_7] \begin{bmatrix} \omega_r - \omega \\ d\omega_r - d\omega \\ H \end{bmatrix} \quad (6)$$

Here, $K_j$ (j=5, 6, 7) is a scalar quantity and a value heuristically set or set according to the above described various kinds of control theories. Further, H is a distance to a point on the route plan nearest the current position p (t0) of the inverted pendulum moving apparatus 1.

Then, the inversion control part 24 estimates disturbance forces $D_R$, $D_L$ respectively applied to the right and left wheels 4R, 4L (S105). The disturbance force estimated (hereinafter, referred to as "estimated disturbance force" accordingly) is a quantity applied to the wheel 4 from outside.

To estimate the estimated disturbance force, torque sensors may be attached to the respective right and left axles and the forces may be calculated by comparison between outputs of the motors 31R, 31L and previously estimated outputs of the motors 31R, 31L, or may be estimated using a disturbance estimation observer (not shown). Note that the estimation of the disturbance force is a known technology, and the detailed explanation will be omitted.

The state quantity calculated from the equation of motion of the inverted pendulum moving apparatus 1 includes the wheel angle φ, the wheel angular velocity dφ, the inclination angle, and the inclination angular velocity, and the disturbance estimation observer obtains the estimated disturbance force by forming an observer of an extended system in which the estimated disturbance force is applied to the state for the inverted pendulum moving apparatus 1. A generally known method is used for the method of designing the disturbance estimation observer. Further, the disturbance estimation observers are set with respect to each of the wheels 4R, 4L. The right and left respective disturbance estimation observers estimate the magnitude and the application directions of the estimated disturbance forces $D_R$, $D_L$ of the wheels 4R, 4L by providing the respective wheel angles $\phi_R$, $\phi_L$, wheel angular velocities $d\phi_R$, $d\phi_L$, inclination angles, inclination angular velocities, and wheel angles of the wheels 4R, 4L as the state quantities of the inverted pendulum moving body and the respective torque designated immediately before to the corresponding motors 31 as input.

Then, the inversion control part 24 discriminates the cause of the estimated disturbance force (disturbance cause) using the magnitude and the directions of the estimated disturbance forces $D_R$, $D_L$, the wheel angular velocities $d\phi_R$, $d\phi_L$, and the motor torque $\tau_R$, $\tau_L$ output immediately before, and calculates instruction torque $\tau_{rR}$, $\tau_{rL}$ to the respective right and left motors 31 in response to the discriminated disturbance cause (S106). The details of step S106 will be described later with FIG. 4.

Then, the inversion control part 24 outputs the instruction torque $\tau_{rR}$, $\tau_{rL}$ calculated at step S106 to the moving mechanism unit 3 (S107), and ends the processing.

[Discrimination of Disturbance Cause and Calculation of Instruction Torque: Step S106 in FIG. 3]

Figure 4:
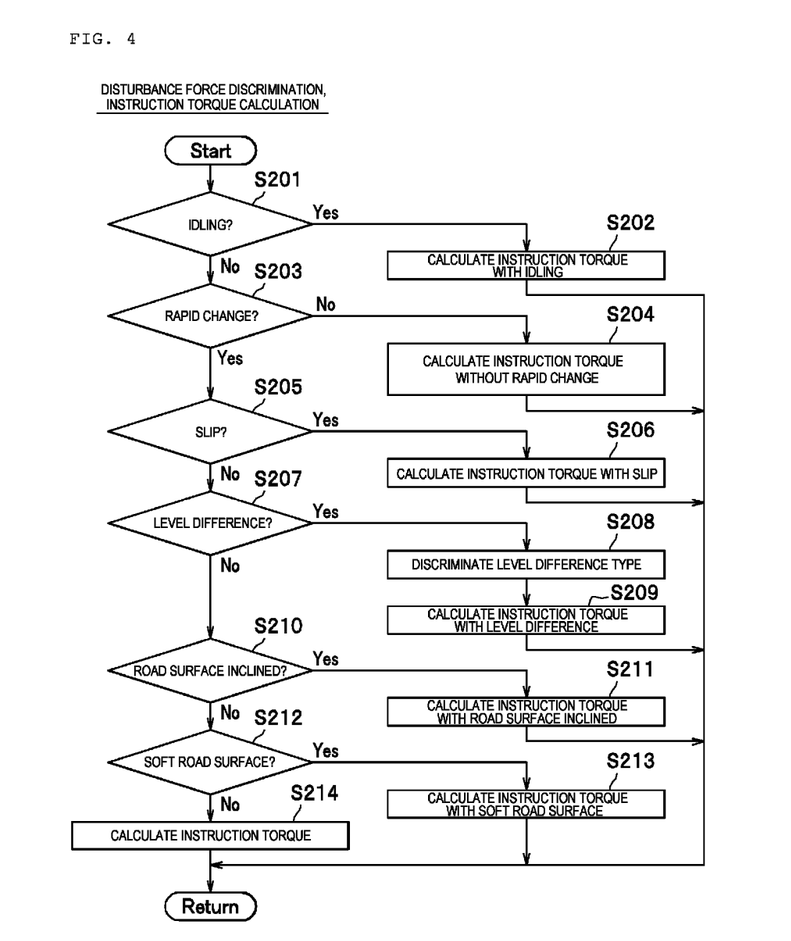
FIG. 4 is a flowchart showing a processing procedure of discrimination of a disturbance cause and calculation of instruction torque according to the embodiment.

FIG. 4 is a flowchart showing a processing procedure of the discrimination of the disturbance cause and the calculation of the instruction torque (step S106 in FIG. 3) according to the embodiment. Note that the flowchart in FIG. 4 shows processing on one wheel 4 of the right and left wheels 4R, 4L (here, the right wheel 4R), and the same processing on the other wheel 4 is performed independently in parallel.

First, the inversion control part 24 determines whether or not the wheel 4R completely idles (S201). If the wheel 4R completely idles (that is, the wheel 4R is not grounded), consideration of the load in the upper body section of the inverted pendulum moving apparatus 1 is not necessary, and the estimated disturbance force $D_R$ is applied in a direction in which the torque applied to the wheel 4R is increased. Accordingly, the inversion control part 24 determines that idling occurs when the following formula (7) is satisfied.

$$\left\| \frac{\tau_R}{J} - \frac{d}{dt}d\phi_R \right\| < \varepsilon \tag{7}$$

Here, $\tau_R$ is actual torque (measured value) applied immediately before, J is moment of inertia of the wheel 4R, and ε is an allowable limit of error. If the formula (7) is true, that is, if the inversion control part 24 determines that idling occurs in the wheel 4R (S201→Yes), control is performed promptly after recovery from idling, and accordingly, it is desirable to make the instruction torque $\tau_{rR}$ to the motor 31 smaller than that without the estimated disturbance force. The inversion control part 24 calculates the instruction torque $\tau_{rR}$ to the motor 31R during idling using the following formula (8) (S202), for example and returns to step S107 in FIG. 3.

$$\tau_{rR} = \tau_s + \tau_s - K_2(\phi - \phi_r) - K_4(d\phi - d\phi_r) \tag{8}$$

Here, $K_2$, $K_4$ are values used for calculation of the translation motor torque $\tau_s$ (step S103 in FIG. 3), an excessive torque demand to the second term of the formula (8) due to excessive expansion of the deviations of the target wheel angle $\phi_r$, the current wheel angle $\phi_r$, the target wheel angular velocity $d\phi_r$, and the current wheel angular velocity $d\phi_r$ because of idling of the wheel 4R may be relaxed by the effect of the third and subsequent terms of the formula (8).

As a result of step S201, if idling does not occur (S201→No), that is, the formula (7) is not satisfied, the inversion control part 24 determines whether or not the wheel angular velocity $d\phi_R$ has changed to turn from sign "+" to zero, turn from sign "−" to zero, and inverse the sign beyond zero within the preset fixed time in the past. That is, the inversion control part 24 determines whether or not the direction of the wheel angular velocity $d\phi_R$ has rapidly changed (S203).

As a result of step S203, if the direction of the wheel angular velocity $d\phi_R$ has not rapidly changed (S203→No), the inversion control part 24 calculates the instruction torque $\tau_{rR}$ to the motor 31R without a rapid change using the following formula (9) (S204), and returns to step S107 in FIG. 3.

$$\tau_{rR} = \tau_s + \tau_c - D_R \tag{9}$$

Using the formula (9), the inversion control part 24 makes correction to the instruction torque $\tau_{rR}$ to the motor 31R to cancel out the disturbance force for the reason that the wheel angular velocity $d\phi_R$ does not change across zero and there is no early sign change derived from the sign of the wheel angular velocity $d\phi_R$.

As a result of step S203, if the direction of the wheel angular velocity $d\phi_R$ has rapidly changed (S203→Yes), the inversion control part 24 determines whether or not slip occurs (S205). The inversion control part 24 determines whether or not slip occurs based on a table shown in FIG. 5, which will be described later.

As a result of step S205, if the determination that slip occurs is made (S205→Yes), the inversion control part 24 calculates the instruction torque $\tau_{rR}$ to the motor 31R with slip using the following formula (10) (S206), and returns to step S107 in FIG. 3.

$$\tau_{rR} = G(\tau_s + \tau_c) \tag{10}$$

Here, G is a preset scalar quantity taking a value from zero to one, and serves early resolution to slip by reducing the motor torque.

As a result of step S205, if the determination that slip does not occur is made (S205→No), the inversion control part 24 determines whether or not the cause of the estimated disturbance force $D_R$ is a level difference (S207). The determination as to whether or not the cause of the estimated disturbance force $D_R$ is a level difference is performed depending on whether or not the wheel angular velocity $d\phi_R$ and the estimated disturbance force $D_R$ satisfy a condition in FIG. 6, which will be described later.

Figure 6:
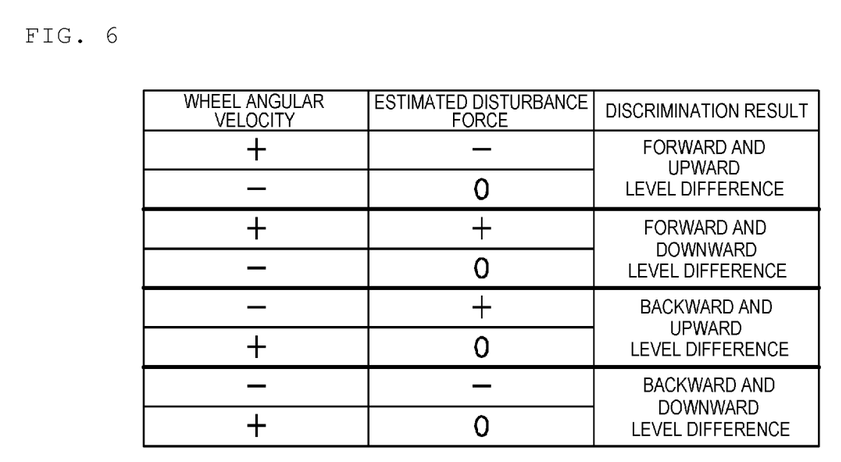
FIG. 6 is a table showing discrimination conditions with respect to level differences.

If the determination that the cause of the estimated disturbance force $D_R$ is a level difference is made (S207→Yes), the inversion control part 24 determines a level difference type of a forward and upward level difference, a forward and downward level difference, a backward and upward level difference, and a backward and downward level difference according to a table in FIG. 6 (S208). Then, the inversion control part 24 generates a level difference signal in which information of the determined level difference type is stored, and transmits the generated level difference signal to the action determination part 21.

Further, the inversion control part 24 calculates the instruction torque $\tau_{rR}$ to the motor 31R with the level difference based on the formula (9) (S209), and returns to step S107 in FIG. 3.

As a result of step S207, if the determination that the cause of the estimated disturbance force $D_R$ is not a level difference is made (S207→No), the inversion control part 24 determines whether or not the cause of the estimated disturbance force $D_R$ is a road surface inclination (S210). The determination as to whether or not the cause of the estimated disturbance force $D_R$ is a road surface inclination is determined depending on whether or not the wheel angular velocity $d\phi_R$ and the estimated disturbance force $D_R$ satisfy a condition of a table in FIG. 7, which will be described later.

As a result of step S210, if the determination that the cause of the estimated disturbance force $D_R$ is a road surface inclination is made (S210→Yes), the inversion control part 24 calculates the instruction torque $\tau_{rR}$ to the motor 31R with the road surface inclination based on the formula (9) (S211), and returns to step S107 in FIG. 3.

As a result of step S210, if the determination that the cause of the estimated disturbance force $D_R$ is not a road surface inclination is made (S210→No), the inversion control part 24 determines whether or not the cause of the estimated disturbance force $D_R$ is a soft road surface (S212). The determination as to whether or not the cause of the estimated disturbance force $D_R$ is a soft road surface is determined depending on whether or not the wheel angular velocity $d\phi_R$ and the estimated disturbance force $D_R$ satisfy a condition of a table in FIG. 8, which will be described later.

As a result of step S212, if the determination that the cause of the estimated disturbance force $D_R$ is a soft road surface is made (S212→Yes), the inversion control part 24 calculates the instruction torque $\tau_{rR}$ to the motor 31R with the soft road surface based on the following formulae (11) (S213), and returns to step S107 in FIG. 3.

$\tau_{rR}=\tau_s+\tau_c+\|D_R\|[d\phi_R>0\|(d\phi_R=0\&\&(\tau_s+\tau_c)>0]$ $\tau_{rR}=\tau_s+\tau_c-\|D_R\|[d\phi_R<0\|(d\phi_R=0\&\&(\tau_s+\tau_c)<0]$ $\tau_{rR}=0[d\phi_R=0\&\&(\tau_s+\tau_c)=0]$ (11)

As a result of step S212, if the determination that the cause of the estimated disturbance force $D_R$ is not a soft road surface is made (S212→No), the inversion control part 24 calculates the instruction torque $\tau_{rR}$ to the motor 31R with the soft road surface based on the formula (9) (S214), and returns to step S107 in FIG. 3.

Through the above described processing, the type of disturbance force (estimated disturbance force) is discriminated and the instruction torque is calculated in response to the discriminated disturbance force. The processing in FIG. 4 is with respect to the right wheel 4R, however, with the wheel angular velocity and the estimated disturbance force of the left wheel 4L, the same processing is performed on the left wheel 4L in parallel to that on the right wheel 4R, and thereby, the discrimination of the disturbance cause for the left wheel 4L is performed.

Note that, in the processing in FIG. 4, the respective determinations at steps S201, S203, S205, S207, S210, S212 are not necessarily performed in this order.

Then, the mechanism control part 32 performs control so that the generated torque $\tau_R$, $\tau_L$ of the motors 31R, 31L may follow the instruction torque $\tau_{rR}$, $\tau_{rL}$ to the right and left motors 31R, 31L transmitted from the inversion control part 24. Further, the mechanism control part 32 acquires the torque $\tau_R$, $\tau_L$ actually generated from the motors 31R, 31L and the wheel angular velocities $d\phi_R$, $d\phi_L$ and the wheel angles $\phi_R$, $\phi_L$ obtained via the motors 31R, 31L and transmits them to the inversion control part 24.

According to the embodiment, the type of disturbance force (estimated disturbance force) is discriminated and the instruction torque in response to the discrimination result is determined, and thereby, the inverted pendulum moving apparatus 1 that may address various kinds of disturbance forces and stably travel may be provided.

[Discrimination Conditions]

Subsequently, discrimination conditions of the type of the respective disturbance forces will be explained with reference to FIGS. 5 to 8. Here, the right wheel 4R will be explained, and the same discrimination conditions are used for the left wheel 4L.

<<Slip: Step S205 in FIG. 4>>

Figure 5:
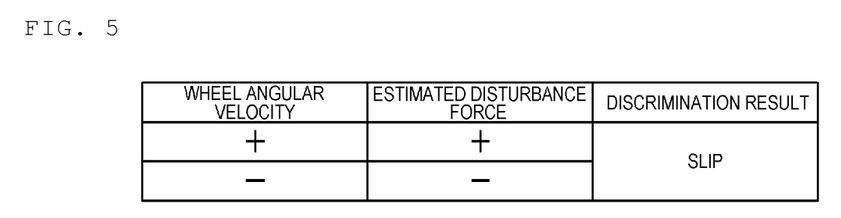
FIG. 5 is a table showing discrimination conditions with respect to slip.

FIG. 5 is a table showing discrimination conditions with respect to slip.

Note that, in FIGS. 5 to 8, the wheel angular velocity with "+" indicates that the wheel 4R rotates so that the inverted pendulum moving apparatus 1 may move forward, and the wheel angular velocity with "−" indicates that the wheel 4R rotates so that the inverted pendulum moving apparatus 1 may move backward.

Further, the estimated disturbance force with "+" indicates that the estimated disturbance force excessively acts on the wheel 4R so that the inverted pendulum moving apparatus 1 may move forward, and the estimated disturbance force with "−" indicates that the estimated disturbance force excessively acts on the wheel 4R so that the inverted pendulum moving apparatus 1 may move backward.

Note that the estimated disturbance force of "0" indicates that no excessive estimated disturbance force acts.

As shown in FIG. 5, when both the initial wheel angular velocity and estimated disturbance force with "+" change to those with "−" within a predetermined time, the inversion control part 24 outputs "slip" as a discrimination result of the disturbance cause. That is, in the case where the wheel 4R of the inverted pendulum moving apparatus 1 that has been traveling forward slips and an excessive force acts in "+" direction with respect to both the wheel angular velocity and estimated disturbance force, then, the inverted pendulum moving apparatus 1 attempts to travel in the opposite direction for balance, and slip also occurs here and an excessive force acts in "−" direction with respect to both the wheel angular velocity and estimated disturbance force, the inversion control part 24 discriminates the disturbance cause to be "slip".

Note that the sequence in which the discrimination conditions are arisen may be reversed. That is, when the initial wheel angular velocity and estimated disturbance force with "−" change to those with "+" within a predetermined time, the inversion control part 24 discriminates the disturbance cause to be "slip".

<<Level Difference: Step S207 in FIG. 4]

(Forward and Upward Level Difference)

FIG. 6 is a table showing discrimination conditions with respect to level differences.

As shown in FIG. 6, when the state of the current (or at a predetermined time) wheel angular velocity of "+" and estimated disturbance force with "−" turns to the state of the wheel angular velocity with "−" and the estimated disturbance force of "0" within a predetermined time, the inversion control part 24 discriminates the disturbance cause to be "forward and upward level difference". This means that the state in which the inverted pendulum moving apparatus 1 has collided with the level difference and is moving over the level difference (wheel angular velocity "+", estimated disturbance force "−") turns to the state in which the inverted pendulum moving apparatus slightly moves backward (wheel angular velocity "−", estimated disturbance force "0") for balance after moving over the level difference.

Note that the sequence in which the discrimination conditions are arisen may be reversed. That is, even when the initial wheel angular velocity with "−" and estimated disturbance force of "0" change to the wheel angular velocity with "+" and the estimated disturbance force with "−" within a predetermined time, the inversion control part 24 discriminates the disturbance cause to be "forward and upward level difference". This means that the inverted pendulum moving apparatus 1 collides with the level difference, moves backward once, and then, moves over the level difference.

(Forward and Downward Level Difference)

Further, when the state of both the current (or at a predetermined time) wheel angular velocity and estimated disturbance force with "+" turns to the state of the wheel angular velocity with "−" and the estimated disturbance force of "0" within a predetermined time, the inversion control part 24 discriminates the disturbance cause to be "forward and downward level difference". This means that the state in which the inverted pendulum moving apparatus 1 is traveling forward and moving downward along the downward level difference (wheel angular velocity "+", estimated disturbance force "+") turns to the state in which the apparatus slightly moves backward (wheel angular velocity "−", estimated disturbance force "0").

Note that the sequence in which the discrimination conditions are arisen may be reversed. That is, even when the initial wheel angular velocity with "−" and estimated disturbance force of "0" change to both the wheel angular velocity and the estimated disturbance force with "+" within a predetermined time, the inversion control part 24 discriminates the disturbance cause to be "forward and downward level difference". This means that, when the inverted pendulum moving apparatus 1 encounters the level difference, the apparatus moves backward once, and then, moves downward off the level difference.

(Backward and Upward Level Difference)

Furthermore, when the state of the current (or at a predetermined time) wheel angular velocity with "−" and estimated disturbance force with "+" turns to the state of the wheel angular velocity with "+" and the estimated disturbance force of "0" within a predetermined time, the inversion control part 24 discriminates the disturbance cause to be "backward and upward level difference". This means that the state in which the inverted pendulum moving apparatus 1 moving backward collides with the level difference and moves over the level difference backward (wheel angular velocity "−", estimated disturbance force "+") turns to the state in which the apparatus slightly moves forward (wheel angular velocity "+", estimated disturbance force "0") for balance after moving over the level difference.

Note that the sequence in which the discrimination conditions are arisen may be reversed. That is, even when the initial wheel angular velocity with "+" and estimated disturbance force of "0" change to the wheel angular velocity with "−" and the estimated disturbance force with "+" within a predetermined time, the inversion control part 24 discriminates the disturbance cause to be "backward and upward level difference". This means that the inverted pendulum moving apparatus 1 collides with the level difference backward, moves forward once, and then, moves over the level difference.

(Backward and Downward Level Difference)

In addition, when the state of both the current (or at a predetermined time) wheel angular velocity and estimated disturbance force with "−" turns to the state of the wheel angular velocity with "+" and the estimated disturbance force of "0" within a predetermined time, the inversion control part 24 discriminates the disturbance cause to be "backward and downward level difference". This means that the state in which the inverted pendulum moving apparatus 1 moving backward is moving backward off the level difference (wheel angular velocity "−", estimated disturbance force "−") turns to the state in which the inverted pendulum moving apparatus 1 slightly moves forward (wheel angular velocity "+", estimated disturbance force "0") for balance.

Note that the sequence in which the discrimination conditions are arisen may be reversed. That is, even when the initial wheel angular velocity with "+" and estimated disturbance force of "0" change to the wheel angular velocity with "−" and the estimated disturbance force with "−" within a predetermined time, the inversion control part 24 discriminates the disturbance cause to be "backward and downward level difference". This means that the inverted pendulum moving apparatus 1 encounters the level difference backward, moves forward once, and then, moves downward off the level difference.

<<Slope: Step S210 in FIG. 4>>

(Upward Slope)

Figure 7:
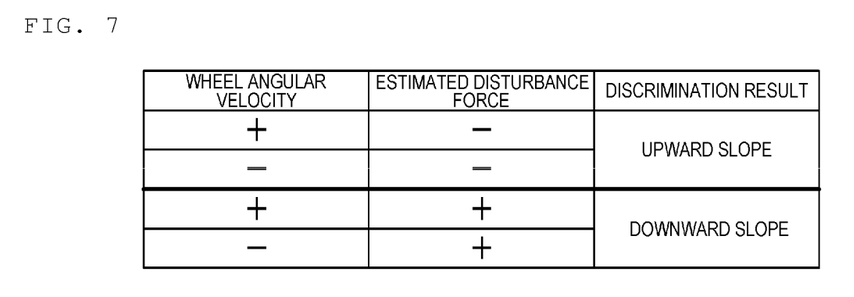
FIG. 7 is a table showing discrimination conditions with respect to slopes.

FIG. 7 is a table showing discrimination conditions with respect to slopes.

As shown in FIG. 7, when the state of the current (or at a predetermined time) wheel angular velocity with "+" and estimated disturbance force with "−" turns to the state of both the wheel angular velocity and the estimated disturbance force with "−" within a predetermined time, the inversion control part 24 discriminates the disturbance cause to be "upward slope". This means that the state in which the inverted pendulum moving apparatus 1 moves upward along the upward slope (wheel angular velocity "+", estimated disturbance force "−") turns to the state in which the apparatus moves downward along the slope once (wheel angular velocity "−", estimated disturbance force "−") for balance.

Note that the sequence in which the discrimination conditions are arisen may be reversed. That is, even when both the initial wheel angular velocity and estimated disturbance force with "−" change to the wheel angular velocity with "+" and the estimated disturbance force with "−" within a predetermined time, the inversion control part 24 discriminates the disturbance cause to be "upward slope". This means that the inverted pendulum moving apparatus 1 starts to move upward along the upward slope, then, immediately, slightly moves downward along the slope once for balance, and climbs the slope.

(Downward Slope)

Further, when the state of both the current (or at a predetermined time) wheel angular velocity and estimated disturbance force with "−" turns to the state of both the wheel angular velocity with "−" and the estimated disturbance force with "+" within a predetermined time, the inversion control part 24 discriminates the disturbance cause to be "downward slope". This means that the state in which the inverted pendulum moving apparatus 1 moving forward moves downward along the downward slope (wheel angular velocity "+", estimated disturbance force "+") turns to the state in which the inverted pendulum moving apparatus 1 climbs the slope once (wheel angular velocity "−", estimated disturbance force "+") for balance.

Note that the sequence in which the discrimination conditions are arisen may be reversed. That is, even when the initial wheel angular velocity with "−" and estimated disturbance force with "+" change to both the wheel angular velocity and the estimated disturbance force with "+" within a predetermined time, the inversion control part 24 discriminates the disturbance cause to be "downward slope". This means that the inverted pendulum moving apparatus 1 starts to move downward along the downward slope, then, immediately, climbs the slope once for balance, and moves downward along the slope.

<<Soft Road Surface: Step S212 in FIG. 4>>

Figure 8:
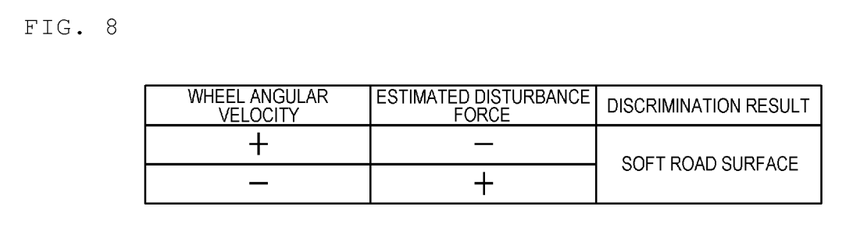
FIG. 8 is a table showing discrimination conditions with respect to soft road surfaces.

FIG. 8 is a table showing discrimination conditions with respect to soft road surfaces.

As shown in FIG. 8, when the road surface is soft, the wheel 4R sinks into the road surface, and if the inverted pendulum moving apparatus 1 moves forward and backward, a resisting force (i.e., the estimated disturbance force opposite to the wheel angular velocity) acts on the wheel 4R. Therefore, as shown in FIG. 8, the state in which the apparatus attempts to move forward, but a resistance (estimated disturbance force) acts backward (wheel angular velocity "+", estimated disturbance force "−") turns to the state in which the apparatus attempts to move backward, but a resistance (estimated disturbance force) acts forward (wheel angular velocity "−", estimated disturbance force "+") within a predetermined time, the inversion control part 24 discriminates the disturbance cause to be "soft road surface".

Note that the sequence in which the discrimination conditions are arisen may be reversed. That is, the state in which the inverted pendulum moving apparatus 1 attempts to move backward, but a resistance (estimated disturbance force) acts forward (wheel angular velocity "−", estimated disturbance force "+") turns to the state in which the apparatus 1 attempts to move forward, but a resistance (estimated disturbance force) acts backward (wheel angular velocity "+", estimated disturbance force "−") within a predetermined time, the inversion control part 24 discriminates the disturbance cause to be "soft road surface".

Another Embodiments

Note that, in the embodiment, the movement target and the route are programmed in advance in the action determination part 21, however, a human may directly designates (operates) them using a joy stick or console. Further, when a human performs operation in real time, the movement target generated by the action determination part 21 does not include the movement destination position. Therefore, the route planning part 22 becomes unnecessary, the velocity planning part 23 plans only the velocity plan on translation, and the plan on turn uses the turn angular velocity constantly input in real time by the operator. In this case, the inversion control part 24 may treat the terms on the position and the turn angle as "0" with respect to the calculation of $\tau_s$, $\tau_c$ using the formulae (5) and (6).

Further, in the series of processing in FIG. 3, the inversion control part 24 uses the estimated disturbance forces $D_R$, $D_L$ without change, however, the values of the estimated disturbance forces $D_R$, $D_L$ may be shaped via a digital filter such as a low-pass filter and used. Furthermore, to eliminate the characteristics derived from the softness of the wheels 4R, 4L themselves, the inversion control part 24 may measure values taken by the estimated disturbance forces $D_R$, $D_L$ in the respective cases of the positive and negative wheel angular velocities $d\phi_R$, $d\phi_L$ on a sufficiently hard road surface in advance, and may respectively subtract the measurement results from the estimated disturbance forces $D_R$, $D_L$ obtained in the processing in FIG. 3 in the respective cases of the positive and negative wheel angular velocities $d\phi_R$, $d\phi_L$ in advance.

Then, the inversion control part 24 may use a threshold value in the discrimination of the disturbance cause in FIG. 4 and, if the absolute value of the disturbance force (estimated disturbance force) is smaller than the threshold value, treat the force as "0".

Further, the inversion control part 24 may use respective conversions of the wheel angular velocity and the wheel angle by the movement velocity, the position, and the turn angular velocity of the inverted pendulum moving apparatus 1 instead.

Furthermore, when discriminating the type of the disturbance force of the level difference, the road surface slope, and the soft road surface, the inversion control part may record the road surface shape and the position information in the memory unit (not shown) at the same time, and makes use of correction using the recorded road surface shape and position information when the subsequent road surface shape and position information are added to the memory unit or the like.

In addition, in the embodiment, the estimated disturbance force by the disturbance estimated observer is used as the disturbance force, however, not limited to that, but a disturbance force measured by a sensor may be used.

According to the embodiment, the type of the disturbance force (estimated disturbance force) is discriminated and the instruction torque in response to the discrimination result is determined as described above, and thus, the inverted pendulum moving apparatus 1 that may address various kinds of disturbance forces and stably travel may be provided.

REFERENCE SIGNS LIST

1 inverted pendulum moving apparatus
2 calculation unit
3 moving mechanism unit
4, 4L, 4R wheel
5 posture sensor
21 action determination part
22 route planning part
23 velocity planning part
24 inversion control part
31, 31L, 31R motor
32 mechanism control part

The invention claimed is:

1. An inverted pendulum moving apparatus having one or more wheels coaxially arranged and a center of gravity of parts mounted on the wheel located above an axle, comprising an inversion control part that discriminates a cause of a disturbance force based on a rotation state of the wheel and determines output torque to the wheel based on a result of discriminating the cause of the disturbance force;
   wherein the rotation state of the wheel is a wheel angular velocity and the disturbance force applied to the wheel; and
   wherein the inversion control part discriminates that a rapid change occurs in a rotation direction of the wheel when a direction of the wheel angular velocity changes within a predetermined time.

2. The inverted pendulum moving apparatus according to claim 1, wherein the inversion control part discriminates the cause of the disturbance force to be slip when both directions of the wheel angular velocity and the disturbance force change from the same direction to a reverse direction within a predetermined time.

3. The inverted pendulum moving apparatus according to claim 1, wherein the inversion control part discriminates the cause of the disturbance force to be a level difference when a direction of the wheel angular velocity changes to a reverse direction and the disturbance force changes from existence to zero within a predetermined time.

4. The inverted pendulum moving apparatus according to claim 1, wherein the inversion control part discriminates the cause of the disturbance force to be a level difference when a direction of the wheel angular velocity changes to a reverse direction and the disturbance force changes from zero to existence within a predetermined time.

5. The inverted pendulum moving apparatus according to claim 1, wherein the inversion control part discriminates the cause of the disturbance force to be a forward and upward level difference when a direction of the wheel angular velocity changes from rotation for moving forward to rotation for moving backward and the disturbance force changes from being in a reverse direction with respect to the rotation direction of the wheel to zero within a predetermined time.

6. The inverted pendulum moving apparatus according to claim 1, wherein the inversion control part discriminates the cause of the disturbance force to be a forward and upward level difference when a direction of the wheel angular velocity changes from rotation for moving backward to rotation for moving forward and the disturbance force changes from zero to being in a reverse direction with respect to the rotation direction of the wheel within a predetermined time.

7. The inverted pendulum moving apparatus according to claim 1, wherein the inversion control part discriminates the cause of the disturbance force to be a forward and downward level difference when a direction of the wheel angular velocity changes from rotation for moving forward to rotation for moving backward and the disturbance force changes from being in a forward direction with respect to the rotation direction of the wheel to zero within a predetermined time.

8. The inverted pendulum moving apparatus according to claim 1, wherein the inversion control part discriminates the cause of the disturbance force to be a forward and downward level difference when a direction of the wheel angular velocity changes from rotation for moving backward to rotation for moving forward and the disturbance force changes from zero to being in a forward direction with respect to the rotation direction of the wheel within a predetermined time.

9. The inverted pendulum moving apparatus according to claim 1, wherein the inversion control part discriminates the cause of the disturbance force to be a backward and downward level difference when a direction of the wheel angular velocity changes from rotation for moving backward to rotation for moving forward and the disturbance force changes from being in a forward direction with respect to the rotation direction of the wheel to zero within a predetermined time.

10. The inverted pendulum moving apparatus according to claim 1, wherein the inversion control part discriminates the cause of the disturbance force to be a backward and upward level difference when a direction of the wheel angular velocity changes from rotation for moving forward to rotation for moving backward and the disturbance force changes from zero to being in a forward direction with respect to the rotation direction of the wheel within a predetermined time.

11. The inverted pendulum moving apparatus according to claim 1, wherein the inversion control part discriminates the cause of the disturbance force to be a backward and downward level difference when a direction of the wheel angular velocity changes from rotation for moving backward to rotation for moving forward and the disturbance force changes from being in a reverse direction to zero with respect to the rotation direction of the wheel within a predetermined time.

12. The inverted pendulum moving apparatus according to claim 1, wherein the inversion control part discriminates the cause of the disturbance force to be a backward and downward level difference when a direction of the wheel angular velocity changes from rotation for moving forward to rotation for moving backward and the disturbance force changes from zero to being in a reverse direction with respect to the rotation direction of the wheel within a predetermined time.

13. The inverted pendulum moving apparatus according to claim 1, wherein the inversion control part discriminates the cause of the disturbance force to be a slope when a direction of the disturbance force does not change, but a direction of the wheel angular velocity changes to a reverse direction within a predetermined time.

14. The inverted pendulum moving apparatus according to claim 1, wherein the inversion control part discriminates the cause of the disturbance force to be an upward slope when a direction of the disturbance force remains a reverse direction with respect to the rotation of the wheel and a direction of the wheel angular velocity changes to the reverse direction within a predetermined time.

15. The inverted pendulum moving apparatus according to claim 1, wherein the inversion control part discriminates the cause of the disturbance force to be a downward slope when a direction of the disturbance force remains a forward direction with respect to the rotation of the wheel and a direction of the wheel angular velocity changes to a reverse direction within a predetermined time.

16. The inverted pendulum moving apparatus according to claim 1, wherein the inversion control part discriminates the cause of the disturbance force to be a soft road surface when directions of the wheel angular velocity and the disturbance force are opposite to each other and the respective directions of the wheel angular velocity and the disturbance force change to reverse directions within a predetermined time.

17. An inverted pendulum moving apparatus having one or more wheels coaxially arranged and a center of gravity of parts mounted on the wheel located above an axle, comprising an inversion control part that discriminates a cause of a disturbance force based on a rotation state of the wheel and determines output torque to the wheel based on a result of discriminating the cause of the disturbance force;

wherein the rotation state of the wheel is a wheel angular velocity and the disturbance force applied to the wheel; and wherein the inversion control part discriminates the cause of the disturbance force to be idling when the following formula (1) is satisfied $$\left\| \frac{\tau}{J} - \frac{d}{dt} d\phi \right\| < \varepsilon, \quad (1)$$

note that where $\tau$ is motor torque, J is moment of inertia of the wheel, $d\phi$ is a wheel angular velocity, and $\varepsilon$ is a predetermined value.

* * * * *